US005530328A

United States Patent [19]
Fernandez et al.

[11] Patent Number: 5,530,328
[45] Date of Patent: Jun. 25, 1996

[54] CONSIST POWER MONITOR

[75] Inventors: Emilio A. Fernandez, Fairfax, Va.;
Angel P. Bezos, Montgomery County, Md.

[73] Assignee: Pulse Electronics, Inc., Rockville, Md.

[21] Appl. No.: 173,686

[22] Filed: Dec. 23, 1993

[51] Int. Cl.⁶ .......................... G06F 15/20; B60T 13/68
[52] U.S. Cl. .......................... 318/370; 318/371; 318/372; 246/187 R; 246/187 C; 364/426.01
[58] Field of Search .................. 318/139, 52, 370–389, 318/87, 56; 364/426.01–426.08, 424.04; 303/33, 20, 70, 3; 180/197; 105/61; 213/1.3; 246/3, 167 R, 187 C, 187 R, 182 R, 182 B

[56] References Cited

U.S. PATENT DOCUMENTS

| | | | |
|---|---|---|---|
| 4,093,900 | 6/1978 | Plunkett | 318/370 |
| 4,236,215 | 11/1980 | Callahan et al. | 364/430 |
| 4,388,569 | 6/1983 | Shipaev et al. | 318/87 |
| 4,402,047 | 8/1983 | Newton et al. | 364/426 |
| 4,423,363 | 12/1983 | Clark et al. | 318/375 |
| 4,553,723 | 11/1985 | Nichols et al. | 246/167 R |
| 4,794,548 | 12/1988 | Lynch et al. | 364/550 |
| 5,041,772 | 8/1991 | Earleson et al. | 318/375 |
| 5,172,316 | 12/1992 | Root et al. | 364/426.01 |
| 5,249,125 | 9/1993 | Root et al. | 364/426.01 |
| 5,303,157 | 4/1994 | Root et al. | 364/426.05 |
| 5,369,587 | 11/1994 | Root et al. | 364/426.01 |
| 5,412,572 | 5/1995 | Root et al. | 364/426.01 |

*Primary Examiner*—Paul Ip
*Attorney, Agent, or Firm*—Whitham, Curtis, Whitham & McGinn

[57] ABSTRACT

A consist power monitor provides information to the engineer of a multiple unit consist on the ability of each locomotive to provide traction power and dynamic braking. The consist power monitor is a microprocessor based device which communicates with other locomotive consist power monitors, either through the MU cable or over a wireless link, to display consist status to the engineer. Where the communication is through the MU cable, the communications link is provided by a high frequency carrier superimposed on an existing MU cable wire. No modification is required to the MU cable allowing for easy retrofit of existing locomotives. The alternative wireless communication is accomplished by means of a low power, spread spectrum data link now being incorporated into new locomotives. Information exchanged among the consist power monitors pertains to loading and dynamic brake conditions of the locomotives in the consist. Locomotive consist information is presented continuously.

9 Claims, 8 Drawing Sheets

CONSIST POWER MONITOR

BACKGROUND OF THE INVENTION

1. Field of the Invention

The present invention generally relates to dynamic braking system excitation and control for diesel electric locomotives and, more particularly, to a power monitor which monitors the operation of the dynamic braking system for each locomotive of a consist.

2. Description of the Prior Art

Locomotive dynamic braking in diesel electric locomotives is used to retard locomotive speed through the conversion of kinetic energy to electrical energy. This is accomplished by connecting the traction motors as separately excited generators with field current being provided by the main generator. Electrical loading is provided by resistive grids which are connected to the traction motor armature circuits during dynamic braking, thus convening the electrical energy to heat energy radiated by the grids. The braking grids are cooled by a blower to prevent overheating. The grid current is determined by the speed of the locomotive and the amount of excitation current applied to the motor fields.

The dynamic braking system is protected in several ways. A dynamic braking regulator module senses a voltage across a portion of one braking grid, this voltage being proportional to the grid (and armature) current. The dynamic braking regulator module operates to limit the excitation current of the motor fields to a value that prevents armature and grid current from increasing above a maximum safe current. A dynamic brake grid protection system module operates in the event of a blower motor failure to disable the brake relay. A dynamic brake protection module contains a motor field protection circuit and a brake warning circuit. The motor field protection circuit operates to protect the motor fields in the event the field excitation current rises above a safe value, while the brake warning circuit provides backup protection for the brake grids by decreasing motor field excitation if grid current increases above a safe value. If a brake grid opens, an open circuit protection relay operates to disable the brake relay.

These various protective circuits prevent catastrophic destruction of the locomotive brake grid and traction motors in the case of a fault occurring during dynamic braking. The engineer is informed of a fault in the dynamic braking system by suitable instrumentation display so that appropriate action can be taken. A problem arises, however, in a typical railroad consist comprising multiple locomotives and cars. The number of locomotives for a given consist is determined on the basis of both the traction power and the dynamic braking required taking into consideration weight and terrain. The several locomotives are interconnected by means of a MU (multiple unit) cable, and the engineer in the cab of the lead locomotive has control over all locomotives in the consist. However, the engineer does not have an instrumentation display to indicate the traction power and dynamic brake system operation of each locomotive in the consist. As a result, a fault may occur in one of the locomotives, and the engineer would be unaware of the fault. For example, if a brake grid circuit in the dynamic braking system of one of the locomotives were open, the amount of dynamic braking that would be available would be less than that which the locomotive engineer thinks that the consist has.

SUMMARY OF THE INVENTION

It is therefore an object of the present invention to provide a consist power monitor to provide information to the engineer of a multiple unit consist on the potential of each locomotive to provide traction power and dynamic braking.

According to the invention, a consist power monitor is provided in each locomotive of a consist. In a preferred implementation of the invention, the consist power monitor is a microprocessor based device which communicates with other locomotive power monitors, either through the MU cable or over a wireless link, to display consist status to the engineer. Where the communication is through the MU cable, the communications link is provided by a high frequency carrier superimposed on an existing MU cable wire. No modification is required to the MU cable allowing for easy retrofit of existing locomotives. The alternative wireless communication is preferably accomplished by means of a low power spread spectrum data link now being incorporated into new locomotives. This wireless communication link is used to provide helper locomotive data to the lead locomotive in the consist.

Each consist power monitor has the capability to transmit as well as to receive data. Information exchanged among the consist power monitors pertains to loading and dynamic brake conditions of the locomotives in the consist. Locomotive consist information is presented continuously, and in the preferred embodiment, comprises four single digit readouts indicating (1) the total number of locomotives in the consist, (2) the total number of locomotives loading, (3) the total number of locomotives that have received a dynamic brake setup signal, and (4) the total number of locomotives developing traction motor current while in dynamic brake. If all locomotives in the consist are operating normally, all four numbers will be the same, but if one or more units fail to power or retard, the corresponding count will be less than the total number of locomotives in the consist. Such an inconsistency in the numerical display is accompanied by the sounding of an alerting horn. The limitation of single digit readouts in this embodiment limit the maximum number of locomotives in a consist to nine, but this is typically more than sufficient.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
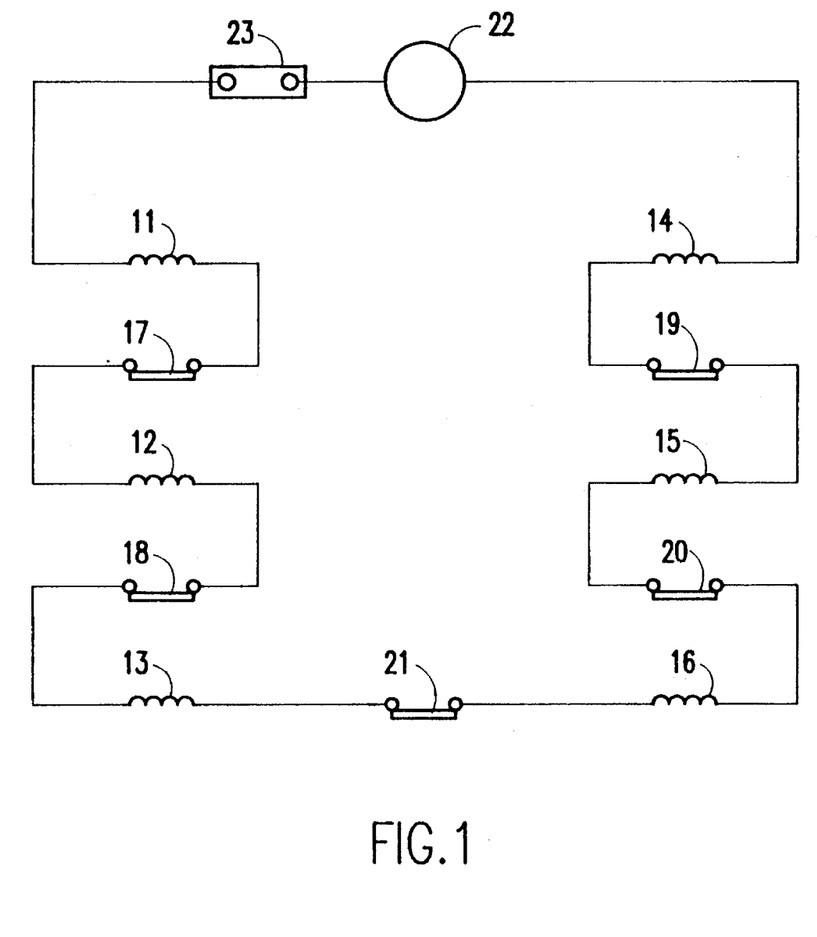
FIG. 1 is a simplified schematic diagram showing the motor field connections during dynamic braking for a six axle locomotive.

Referring now to the drawings, and more particularly to FIG. 1, there is shown a simplified schematic diagram of the motor field connections during dynamic braking of a six axle locomotive. The six motor fields 11 to 16 are connected in series by means of contactors 17 to 21 and excited by the generator 22. The excitation current is controlled by the shunt 23 which is in turn controlled by the braking level (throttle) position.

Figure 2:
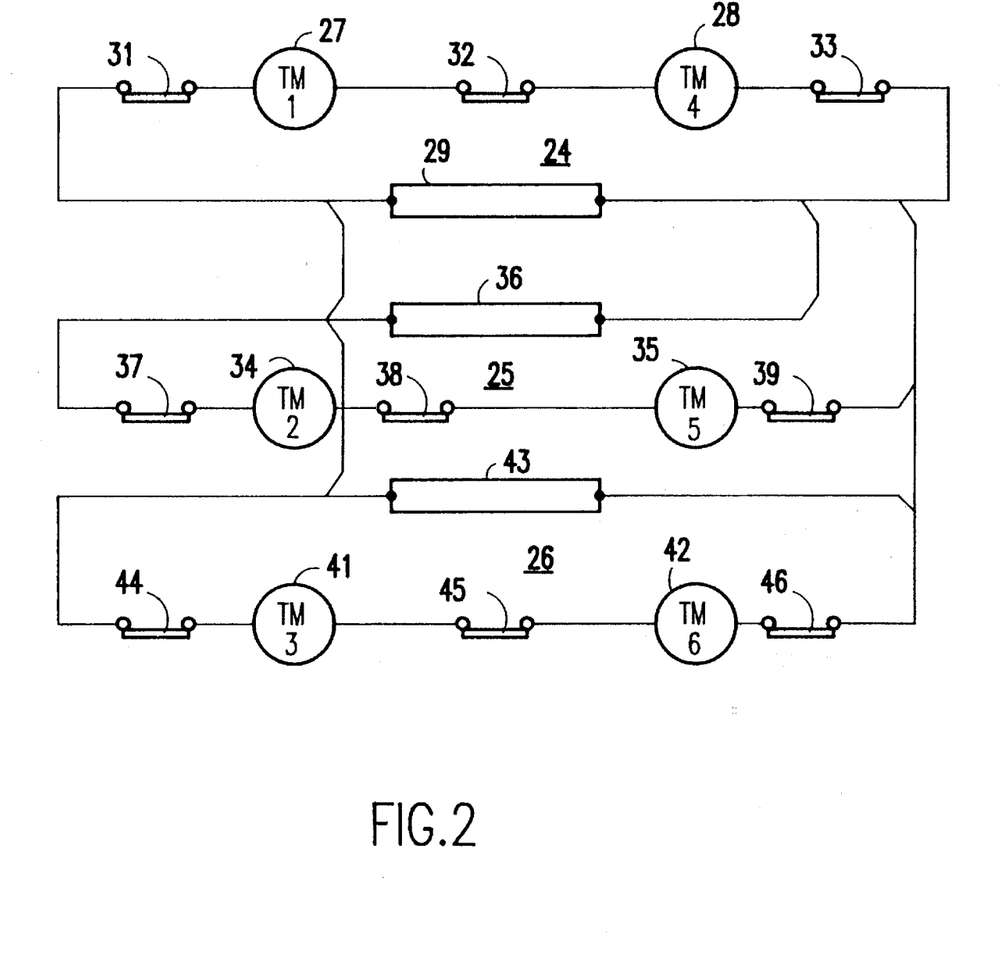
FIG. 2 is a simplified schematic diagram showing the motor armature connections during dynamic braking for a six axle locomotive.

In dynamic braking, the traction motor armatures are paired in series with resistive grids, as shown in FIG. 2. Two or three current loops exist, depending on whether the locomotive is a four or six axle unit. For the example of a six axle unit shown in FIG. 2 there are three current loops 24, 25 and 26. Current loop 24 comprises the armatures 27 and 28 of the first and fourth traction motors connected in series with resistive grid 29 by means of contactors 31, 32 and 33. Current loop 25 comprises the armatures 34 and 35 of the second and fifth traction motors connected in series with resistive grid 36 by means of contactors 37, 38 and 39. Current loop 26 comprises the armatures 41 and 42 of the third and sixth traction motors connected in series with resistive grid 43 by means of contactors 44, 45 and 46.

Current flow in each independent loop is normally similar and depends on 1) motor (configured as a "generator") characteristics (all motors being the same), 2) resistive grid (same value in all loops), 3) level of motor field excitation (regulated by the locomotive engineer but the same for all motors), and 4) wheel size, which are closely matched. Typical failure modes are either an excitation problem affecting all motor-grid loops or an open circuit in any one loop.

The strategy adopted in the preferred embodiment of the invention is to monitor armature current in one loop and the presence of current in the other loops, this being a very strong indication of the health of the dynamic braking system. Locomotives predating microprocessor based units have a shunt on traction motor number two only. This permits the measurement of armature current in one of the braking loops. Adding other shunts is not preferred as it is expensive. An alternative method is to establish the presence of current in the other brake grid loops. This is less costly and can be accomplished by indirect means such as grid temperature rise, grid fan rotation, voltage measurement across grids (or motors), clamp-on current detectors and the like. In modern locomotives incorporating microprocessor control units, armature current for each braking loop is already measured and therefore no indirect current measurements are required; however, microprocessor based locomotives comprise only 10 to 15% of the road power fleet in the USA today.

Figure 3:
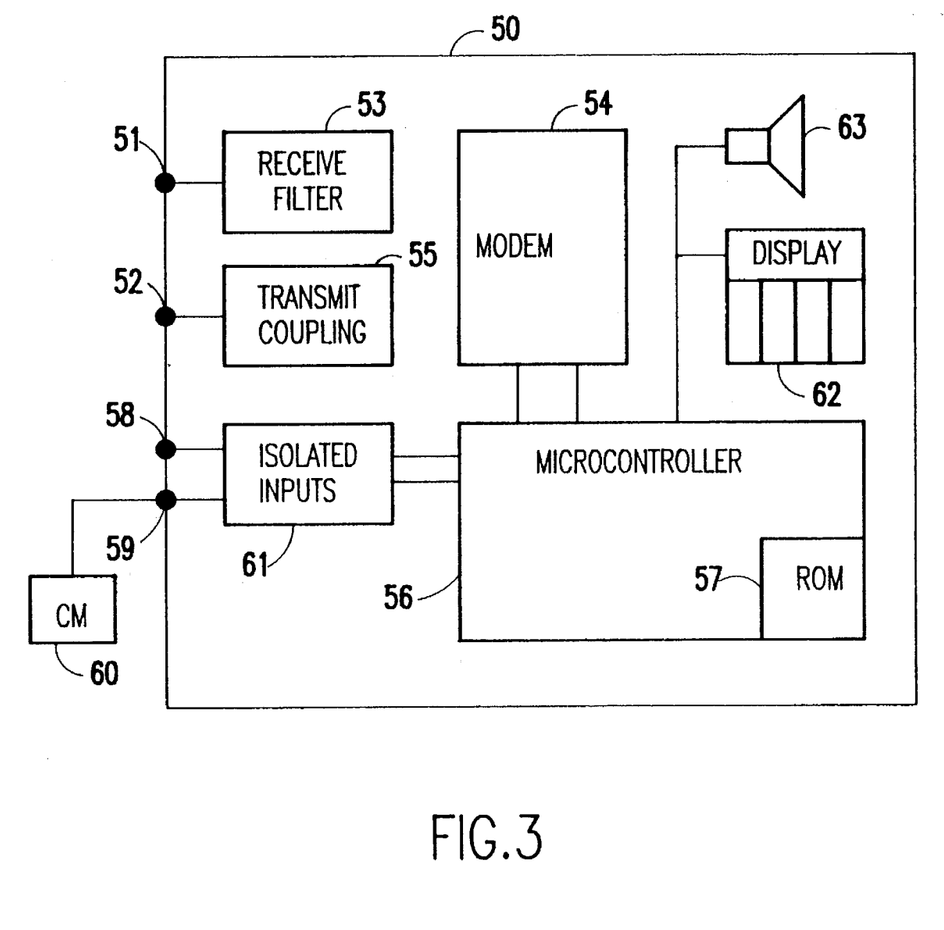
FIG. 3 is a block diagram of the consist power monitor according to a preferred embodiment of the invention.

FIG. 3 is a block diagram showing the major components of the consist power monitor 50 according to the preferred embodiment of the invention. In this embodiment, the connections are to the MU cable at terminals 51 and 52. The data signal is modulated on a selected pair of wires in the MU cable. A receive filter 53, centered on the modulating frequency, provides an output to modem (for modulator/demodulator) 54. Data to be transmitted on the MU cable is supplied by the modem 54 to a transmit coupling 55 connected to the terminals 51 and 52. The receive filter 53 and the transmit coupling 55 are of the type typically used to receive or supply a signal to a power line and are both conventional.

The demodulated data from the modem 54 is output to a microcontroller 56. The microcontroller is composed of a microprocessor with supporting circuitry including read only memory (ROM) 57, storing the monitor identification (ID) and control program, and random access memory (RAM) (not shown) for temporary storage. The ROM 57 may be a flash memory allowing the control program to be conveniently updated to provide additional features. The microcontroller 56 also supplies data to the modem 54 which, in turn, outputs the data as a modulating signal to the transmit coupling 55.

Consist power monitor 50 also receives inputs at terminals 58 and 59 corresponding to the dynamic brake setup and the load. The load signal is supplied by a current monitor (CM) 60 connected to terminal 59. The load signal is a frequency modulated signal output by the CM 60 which monitors the current of a traction motor armature. The dynamic brake setup is logic value "1" when the engineer sets up the dynamic brakes in preparation to actually applying the brakes. These inputs are electrically isolated by input isolation circuitry 61 and supplied to the microcontroller 56. Based on this input data and the data supplied from modem 54, the microcontroller 56, running the control program in ROM, generates outputs to a 4-digit display 62 and a horn 63.

Figure 4:
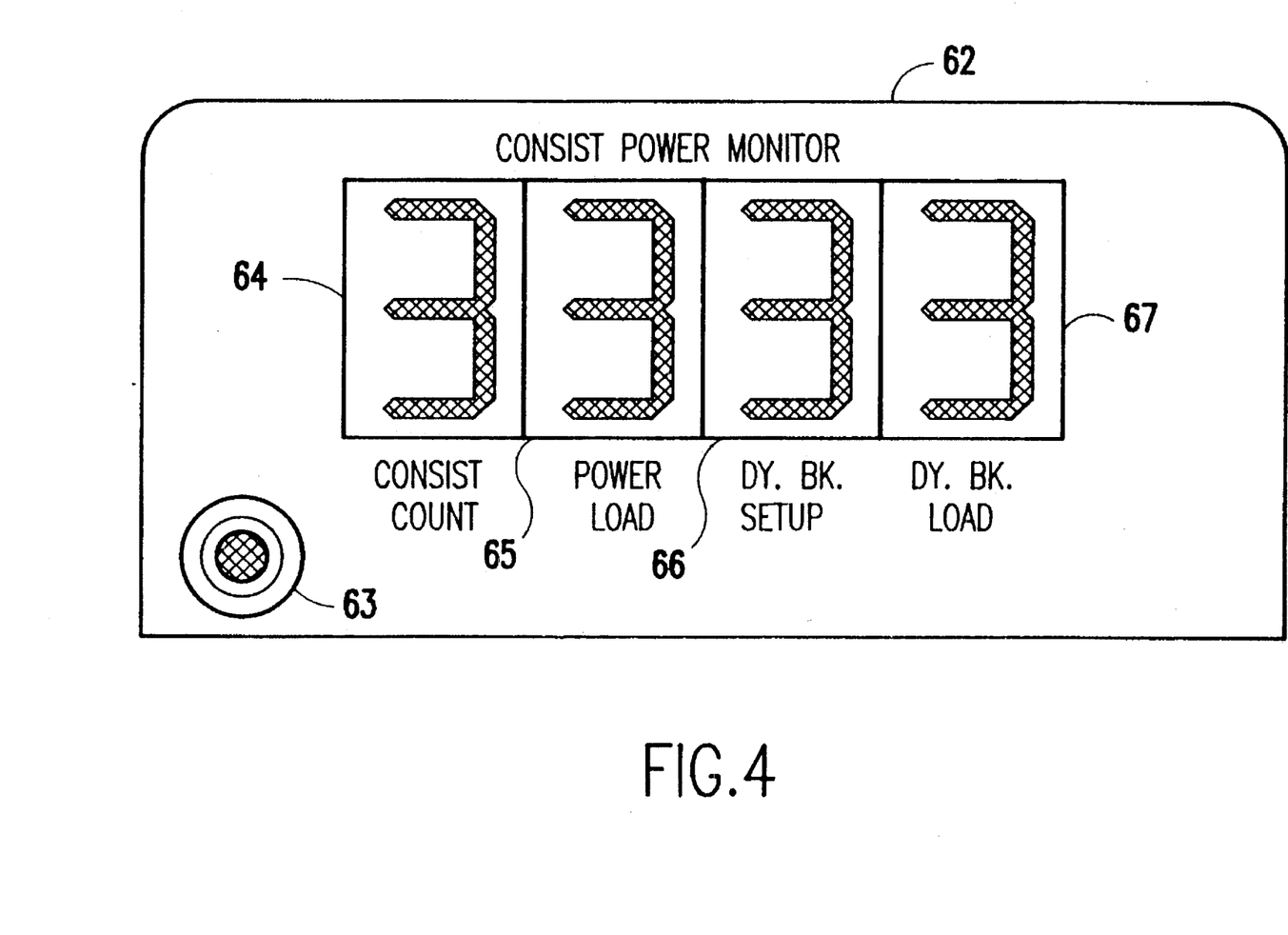
FIG. 4 is an elevation of the display panel of the consist power monitor of the preferred embodiment of the invention.

FIG. 4 shows an example of the consist power monitor display 62. There are four, single digit numerals 64, 65, 66, and 67. Numeral 64 shows the number of locomotives in the consist. Numeral 65 shows the number of locomotives in the consist which are loading based on traction motor current. Numeral 66 shows the total number of locomotives in the consist that have received the dynamic brake setup signal. Numeral 67 shows the number of locomotives in the consist developing traction motor current while in dynamic brake. In a consist of locomotives operating normally, all four numerals are the same. If one or more units fail to power or retard, the condition will be apparent to the engineer by observing that the corresponding count for numerals 65, 66 and/or 67 is less than the count for numeral 64. To alert the engineer of a failure, numeral 64 flashes continuously. In addition, the alerting horn 63 gives three short blasts once a minute. Of course, modifications of this procedure can be made in the practice of the invention. For example, all numerals may be made to flash or a separate warning light may be added. The alerting horn may be continuous or have a different repetition frequency.

From the foregoing, it will be appreciated that the data processed by the microcontroller 56 shown in FIG. 3 includes the following:

- the number of locomotives in the consist,
- the number of locomotives in the consist which are loading based on traction motor current,
- the total number of locomotives in the consist that have received the dynamic brake setup signal, and
- the number of locomotives in the consist developing traction motor current while in dynamic brake. The consist power monitor on each locomotive generates this data from the data input at terminals 58 and 59 and from the data received via modem 54 and, in turn, it transmits its own locomotive data via modem 54. Each consist power monitor 50 is assigned a unique identification (ID) which is used to transmit its data to the consist power monitors on board the other locomotives in the consist.

The number of locomotives in the consist is determined by simply counting the number of consist power monitor IDs, plus the local monitor ID, and storing that count. The number of locomotives in the consist which are loading is determined by counting those locomotives whose consist power monitors which report a current load. The total number of locomotives in the consist that have received the dynamic brake setup signal is determined by counting those locomotives whose consist power monitors report dynamic brake setup. Fewer than all the locomotives in the consist may be setup for dynamic braking, and a load may be reported by a locomotive's power monitor even though it was not setup for dynamic braking. For instance, a control failure might prevent a locomotive from setting up for dynamic brake. In this instance, it would be possible for this locomotive to be erroneously setting up for power rather than braking and thus a load may be reported by the locomotive's power monitor. Since the number of locomotives in the consist developing traction motor (load) current while in dynamic braking is also displayed, by comparing the dynamic brake setup number with the load number, the nature of the failure can be isolated.

Several protocols may be adopted to avoid or minimize collisions in the transmitted data. In the preferred embodiment, the protocol adopted is a randomized broadcast protocol wherein each consist power monitor broadcasts its data on a periodic basis but the intervals assigned to the consist power monitors vary from one half second to one and one half seconds. A transmission by one consist power monitor is further delayed if a transmission by another is currently in progress. While this protocol does not guarantee an avoidance of collisions, in practice there is less than a thirty percent rate of collisions which has proved quite satisfactory.

An alternative protocol that guarantees no collisions in the transmission by the consist power monitors is to designate the consist power monitor in the lead locomotive as the master, the other consist power monitors being slaves. This is done by the engineer when the consist power monitor is initially being set up. The master would periodically poll the slaves which, in response to a poll with their ID, transmit data related to their locomotive. Another alternative protocol uses a token ring protocol whereby a token is passed from one consist power monitor to the next in a predetermined order. Upon receiving the token, the consist power monitor broadcasts data relating to its locomotive to all other consist power monitors. Yet another alternative is to assign priorities to the consist power monitors according to their respective IDs.

Figure 5A:
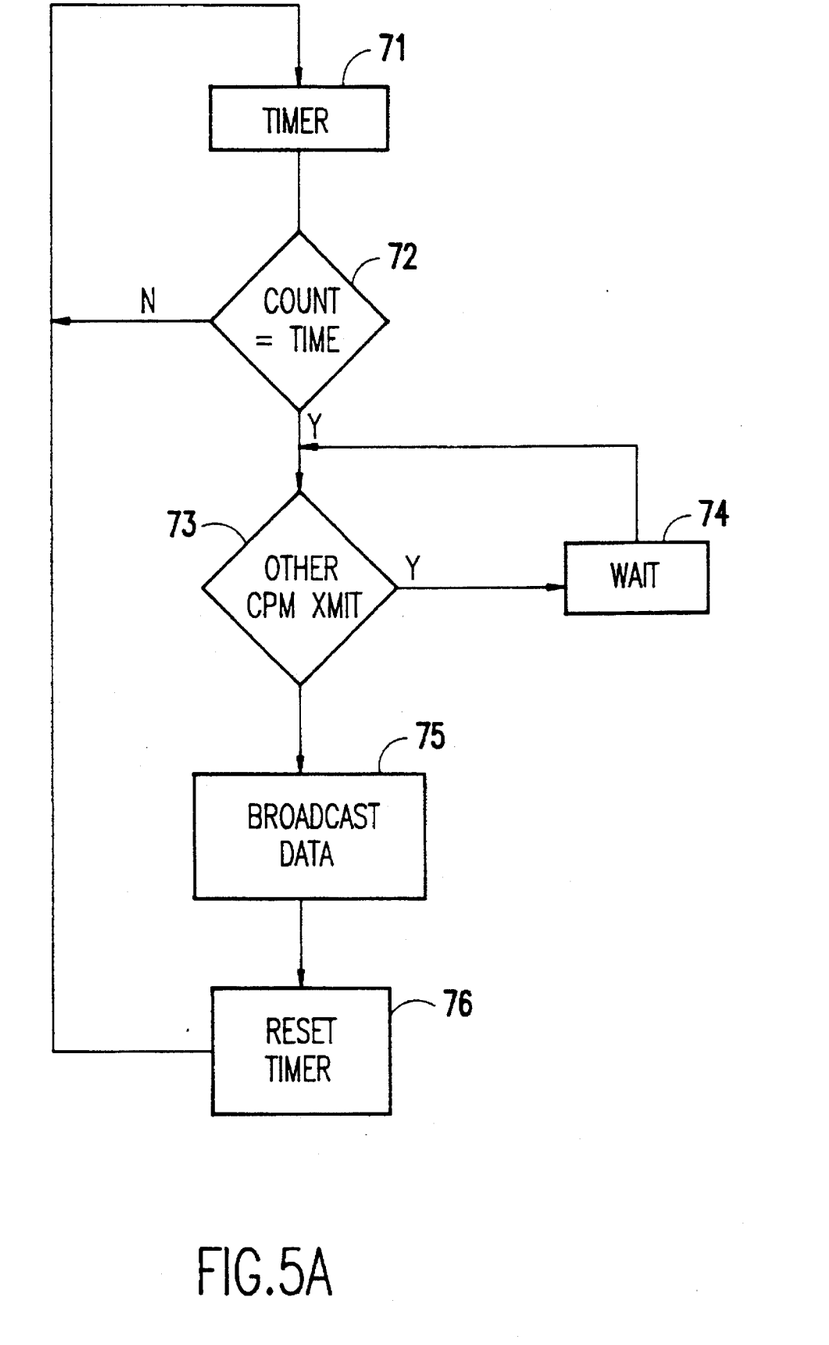
FIG. 5A is a flowchart of the logic of the data transmission program, and FIGS. 5B and 5C, taken together, are a flowchart of the logic of the data management and display program, both run by the microcontroller in the consist power monitor shown in FIG. 3.

FIG. 5A is a flowchart showing the logic of the data transmission program run by the microcontroller 56. Each consist power monitor has a timer 71 which has a timing interval of from one half second to one and one half seconds. The average interval is therefore one second. The intervals from one power monitor to the next are randomized. The time is checked in the decision block 72 to determine if the interval for this power monitor has been counted. If not, the process loops until the interval has been counted. Then in decision block 73 a check is made to determine if another power monitor is transmitting. If so, this power monitor waits at function block 74 until the other power monitor has completed its transmission. At that time, the consist power monitor broadcasts its data at function block 75 and then resets the timer in function block 76.

Figure 5B:
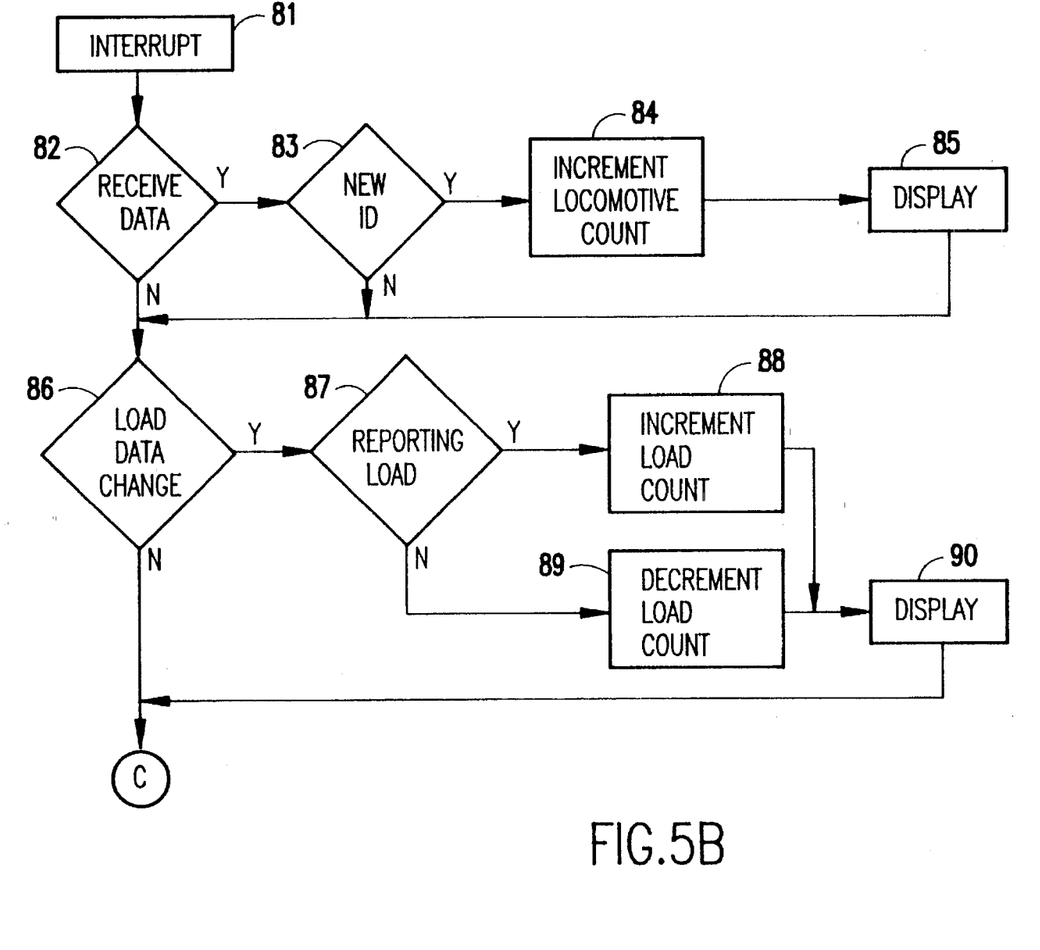
Figure 5C:
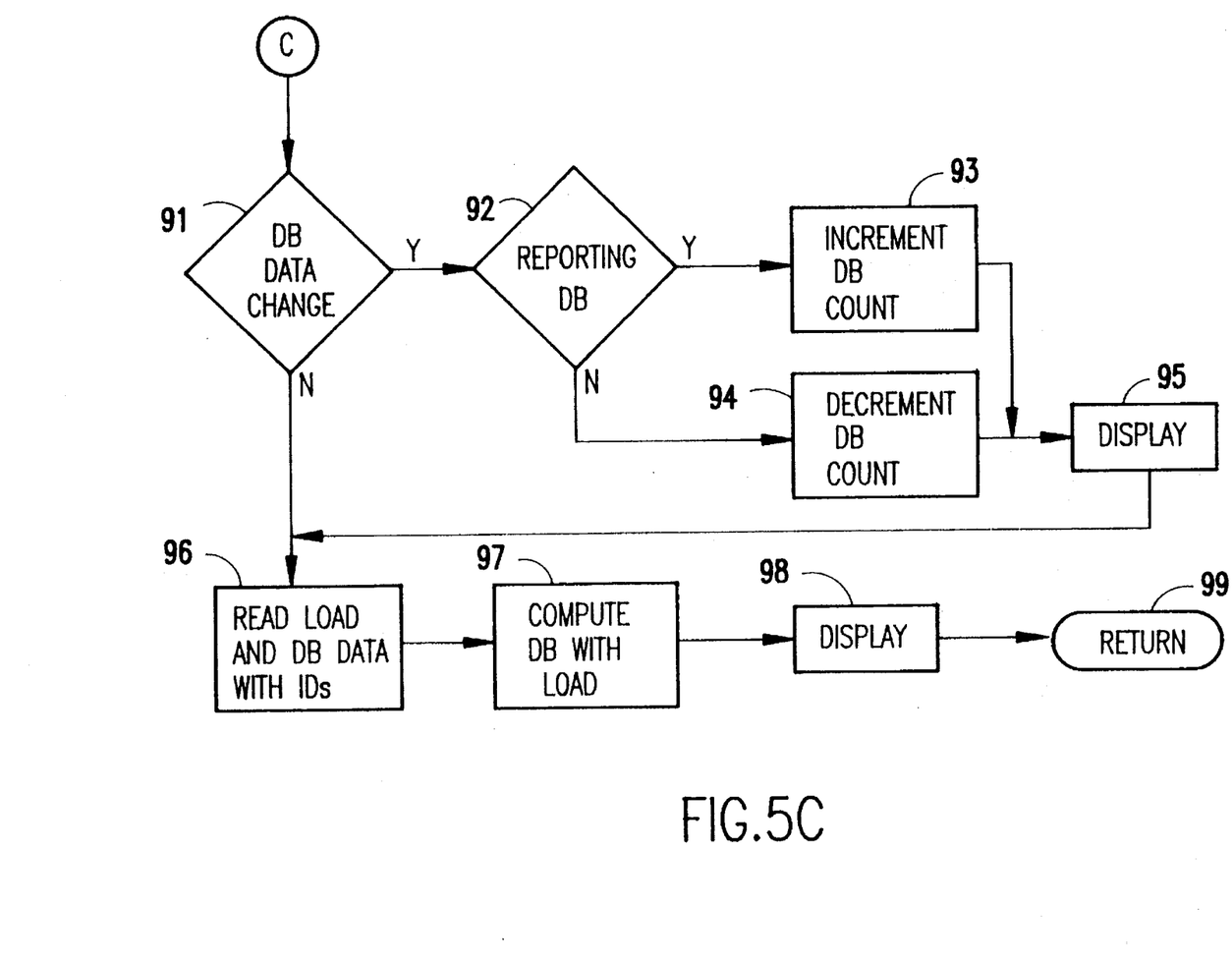

FIGS. 5B and 5C, taken together, are a flowchart showing the logic of the data management and display program resulting from an interrupt generated either locally, by a change of data at one or the other of the inputs at terminals 58 and 59, or remotely, by an input from modem 54. The two flowcharts are joined by the connector C.

Reference is first made to FIG. 5B. When an interrupt is detected at function block 81, a determination is made in decision block 82 as to whether the interrupt is due to the reception of data. If so, a determination is next made a decision block 83 to determine if this is a new ID. If not, a return is made to the main process; otherwise, the number of locomotives in the consist is increased by one in function block 84, and the display 64 is updated in function block 85 before a return is made to the main process. In other words, the number of different IDs are counted to provide a count of locomotives, and each consist power monitor stores the data from other power monitors by ID and, therefore, the data stored can be correlated by locomotive.

In the main process, a test is made in decision block 86 to determine if a change in load data is being reported, either by the current monitor (CM) 60 at the local consist power monitor or from a remote consist power monitor. If so, a further determination is made in decision block 87 to determine if a load is being reported. If so, the number of locomotives reporting loading is increased by one in function block 88, and the display 65 is updated in function block 90 before a return is made to the main process; otherwise, the number of locomotives reporting loading is decreased by one in function block 89, and the display 65 is updated in function block 90 before a return is made to the main process.

Referring now to FIG. 5C, a determination is made in decision block 91 as to whether a change dynamic brake setup data has changed. If so, a further determination is made in decision block 92 as to whether a dynamic brake setup is being reported. If so, the number of trains reporting dynamic brake setup is incremented by one in function block 93 and the display 66 is updated in function block 95 before returning to the main process; otherwise, the number of locomotives reporting a dynamic setup condition is decreased by one in function block 94, and the display 66 is updated in function block 95 before a return is made to the main process.

Finally, in function block 96, the load and dynamic brake setup data is read from memory with IDs, and the number of locomotives reporting loading under dynamic braking is calculated in function block 97. Based on this calculation, the display 67 is updated in function block 98 before a return is made at block 99.

Figure 6:
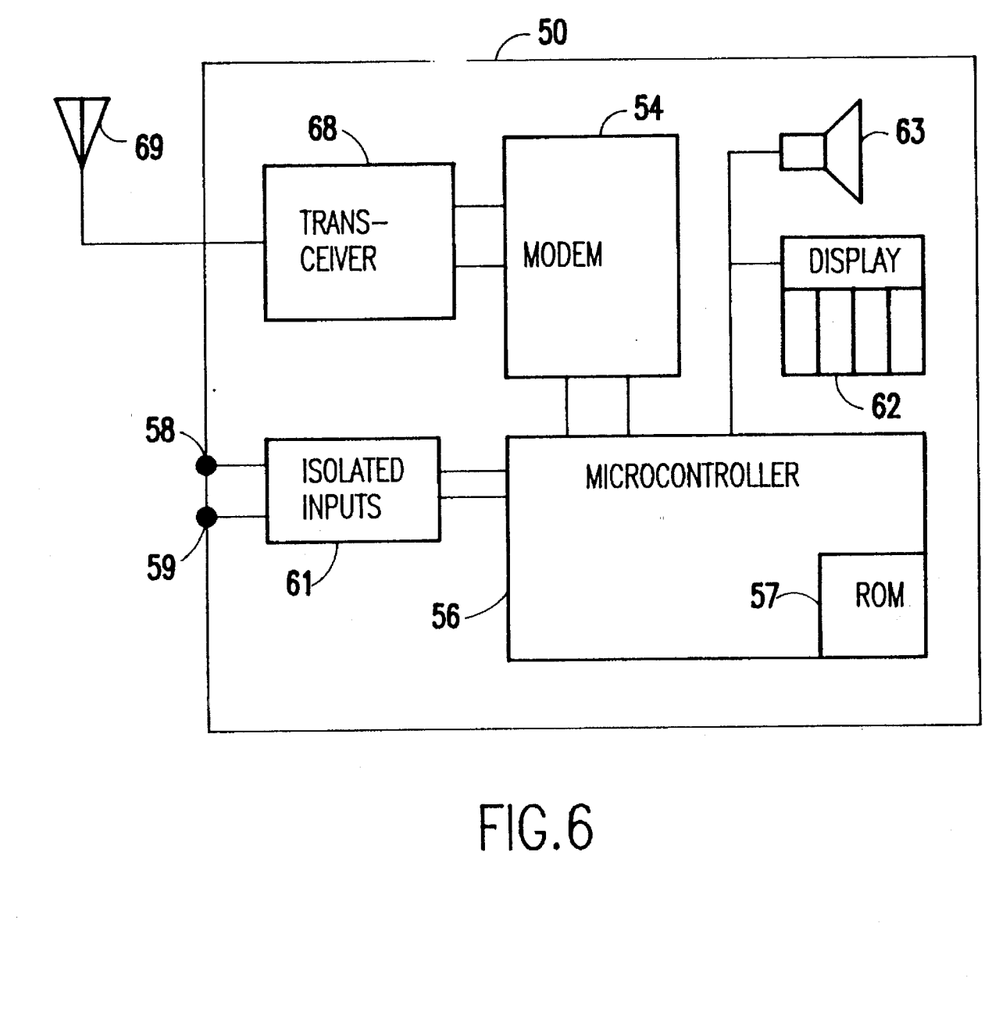
FIG. 6 is a block diagram of an alternative embodiment showing a wireless communication between consist power monitors.

FIG. 6 is a block diagram showing a modification to the basic consist power monitor where communication among the power monitors in the several locomotives is by a wireless link. Common reference numerals designate like or similar components shown in FIG. 3. In this embodiment, the receive filter 53 the transmit coupling 55 are replaced by a low power, broadband transceiver 68, preferably a spread spectrum transceiver. The transceiver 68 is connected to the modem 54 and an antenna 69 to transmit and receive data. Other than this modification, the two embodiments operate in essentially the same manner.

What has been disclosed is a preferred embodiment of the invention. The display shown in FIG. 4 could be made more elaborate to provide additional information. For example, the loading of each traction motor could be monitored and displayed individually. The choices made, however, minimize the amount of information the engineer needs to evaluate while at the same time providing the engineer with sufficient information to insure the safe operation of the train. Therefore, those skilled in the art will recognize that the invention can be practiced with these and other modifications within the spirit and scope of the appended claims.

Having thus described our invention, what we claim as new and desire to secure by Letters Patent is as follows:

1. A consist power monitor for a railroad consist having multiple locomotives comprising:

current measuring means in at least one dynamic braking loop of traction motors and current sensing means in other dynamic braking loops of traction motors not provided with current measuring means;

a storage device for storing a locomotive identification code;

a processor connected to said storage device and responsive to said current measuring means and said current sensing means for formatting a data frame containing said locomotive identification code and data pertaining to measured and sensed current for said dynamic braking loops;

a transmitter controlled by said processor for transmitting to other consist power monitors in other locomotives in said consist said data frame;

a receiver providing an input to said processor for receiving transmitted data frames from other consist power monitors in said consist; and a display controlled by said processor for displaying a count of locomotives in said consist and traction and dynamic braking performance of locomotives in said consist.

2. A consist power monitor as recited in claim 1 wherein said transmitter comprises means for providing a modulated data signal on a multiple unit (MU) cable line and said receiver comprises means for detecting a modulated data signal on the MU cable line, said MU cable interconnecting the locomotives in the consist and said MU cable line function not being affected by the modulated data signal.

3. A consist power monitor as recited in claim 1 wherein said transmitter and said receiver together comprise a low power, broad band transceiver.

4. A consist power monitor as recited in claim 3 wherein said transceiver is a spread spectrum transceiver.

5. A consist power monitor as recited in claim 1 wherein said display displays a number of locomotives in the consist, a number of locomotives reporting loading, and a number of locomotives reporting a dynamic brake setup condition.

6. A consist power monitor as recited in claim 5 wherein said processor computes a number of locomotives reporting both a dynamic brake setup condition and loading, said display further displays said number of locomotives reporting both a dynamic brake setup condition and loading.

7. A consist power monitor as recited in claim 1 further comprising an audible alarm controlled by said processor to sound an alarm when less than a number of locomotives in the consist report loading during dynamic braking.

8. A consist power monitor as recited in claim 7 wherein said processor further controls said display to provide a visual signal when less than a number of locomotives in the consist report loading during dynamic braking.

9. A consist power monitor for a railroad consist having multiple locomotives comprising:

current measuring means in at least one traction motor;

a storage device for storing a locomotive identification code;

a processor connected to said storage device and responsive to said current measuring means for formatting a data frame containing said locomotive identification code and data pertaining to measured and sensed current for said one traction motor;

a transmitter controlled by said processor for transmitting to other consist power monitors in other locomotives in said consist said data frame;

a receiver providing an input to said processor for receiving transmitted data frames from other consist power monitors in said consist; and a display controlled by said processor for displaying a count of locomotives in said consist and traction and dynamic braking performance of locomotives in said consist.

* * * * *